United States Patent [19]
Kühnrich et al.

[11] Patent Number: 4,482,700
[45] Date of Patent: Nov. 13, 1984

[54] METHOD FOR THE PREPARATION OF LIGHT-COLORED POLYESTERS WITH THE USE OF TITANIUM CATALYSTS

[75] Inventors: Robert Kühnrich, Oer-Erkenschwick; Gerhard Schade, Witten; Bernd Elmenthaler, Dortmund, all of Fed. Rep. of Germany

[73] Assignee: Dynamit Nobel AG, Cologne, Fed. Rep. of Germany

[21] Appl. No.: 566,711

[22] Filed: Dec. 29, 1983

[30] Foreign Application Priority Data

Jan. 7, 1983 [DE] Fed. Rep. of Germany ....... 3300315

[51] Int. Cl.$^3$ .............................................. C08G 63/34
[52] U.S. Cl. .................................... 528/279; 528/274; 528/286
[58] Field of Search ........................ 528/274, 279, 286

[56] References Cited

U.S. PATENT DOCUMENTS

| | | | |
|---|---|---|---|
| 3,441,540 | 4/1969 | Müller et al. | 528/279 X |
| 4,082,724 | 4/1978 | Hewertson | 528/279 X |
| 4,101,526 | 7/1978 | Buxbaum | 528/279 X |
| 4,115,371 | 9/1978 | Bier et al. | 528/279 X |
| 4,424,140 | 1/1984 | Weinberg et al. | 528/279 X |

*Primary Examiner*—Lucille M. Phynes
*Attorney, Agent, or Firm*—Felfe & Lynch

[57] ABSTRACT

A method for the preparation of mixed polyesters with the use of titanium catalysts, wherein addition products prepared from phosphorous acid and monoepoxides are utilized, especially in the esterification stage and the subsequent polycondensation stage of the process. The resulting polyester is free from discoloration.

11 Claims, No Drawings

METHOD FOR THE PREPARATION OF LIGHT-COLORED POLYESTERS WITH THE USE OF TITANIUM CATALYSTS

BACKGROUND OF THE INVENTION

It is known to prepare amorphous or crystalline polyesters having properties adapted to a particular application, from polyfunctional alcohols, i.e., diols, triols or polyols and polybasic carboxylic acids, i.e., di-, tri- or polycarboxylic acids or their derivatives.

If a multi-step synthesis is performed, the first step can be a transesterification reaction using low alkyl esters, especially methyl esters, of the carboxylic acids, the second step can be an esterification reaction involving the use of carboxylic acids, and the third step can be a polycondensation reaction. If esters of carboxylic acids are not used, the preparation begins with the esterification. Each of these steps requires, as a rule, different catalysts, since the zinc, cadmium, manganese or calcium transesterification or esterification catalysts either do not accelerate the esterification or polycondensation reaction sufficiently, or, in the higher concentrations necessary for the esterification or polycondensation reaction, which are higher than those required for the transesterification or esterification reaction, they produce not only the polycondensation reaction but also degradation reactions resulting in discoloration, among other undesirable effects. But as the percentage of degradation products in the polycondensates increases, their useful properties are impaired.

Consequently, in the state of the art, the concentration of the transesterification and/or esterification catalysts is kept at a low level that is only high enough to provide for the smooth course of the reaction, or the catalyst of the transesterification step is deactivated after the reaction, for example by the addition of phosphorus compounds such as phosphoric acid, phosphorous acid, hypophosphorous acid, phosphinic acid, or esters or salts thereof, and the polycondensation is performed after a different catalyst has been added.

Large numbers of catalysts suitable for the polycondensation are specified in R. E. Wilfang, J. Polymer Sci. 54 (1961) 388. Soluble antimony compounds are frequently used, especially for the polycondensation on account of their good catalytic action. They have the disadvantage, however, that they easily react to form metallic antimony, which gives a gray discoloration to the polycondensate.

Compounds of other metals, however, are less active polycondensation catalysts, they require greater molar amounts or longer reaction times before the desired molecular weights are reached, they catalyze secondary reactions or degradation reactions more than antimony compounds do, or they necessitate the addition of the above-named phosphorus compounds for deactivation.

It is also known to use soluble titanium compounds as polycondensation catalysts. According to H. Zimmermann: Faserforschung u. Textiltechnik 13 No. 11 (1962), 481 to 490, their catalytic activity is comparable to that of antimony compounds, and the secondary reactions are tolerable. Titanium compounds, however, have the disadvantage of giving the polycondensates a yellowish-brown discoloration, especially when ethylene glycol is a component of the polyesters.

The problem therefore existed of reducing the polycondensate discoloration which is produced by titanium catalysts and of increasing insofar as possible the activity of titanium catalysts.

DESCRIPTION OF THE INVENTION

The subject matter of the invention is therefore a method for the preparation of polyesters from polyfunctional alcohols and polybasic carboxylic acids and/or their alkyl esters and/or their anhydrides, in the presence of catalytically active titanium compounds, and, if desired, of other known transesterification, esterification and polycondensation catalysts and additional adjuvants, characterized in that catalytic amounts of addition products prepared from phosphorous acid and monoepoxides are used as adjuvants.

The term, "titanium catalysts," as used herein, is to be understood to refer to any known titanium catalysts, preferably titanium esters of aliphatic or cycloaliphatic alcohols having 3 to 12, especially 4 to 10, carbon atoms, such as butyl titanate and octyl titanate, as well as soluble titanium chelates prepared from e.g. 1,3-diols, especially from 2,2,4-trimethyl-1,3-pentanediol, 2-methyl-2,4-pentanediol or 2-ethyl-1,3-hexanediol. The addition products used in addition to the titanium catalysts are especially suitable for the esterification step, and to the same extent for the polycondensation step that follows. Polyesters of a low degree, and especially polyesters of a high degree of polycondensation can be prepared with their aid. The soluble titanium chelates prepared from the listed diols are known as tetraochylene glycol titanate and tetrahexylene glycol titanate, respectively.

The addition products make it possible to produce light-colored polyesters of very low color numbers, instead of greatly discolored polyesters.

Surprisingly, the addition products increase the activity of the titanium catalysts, so that the esterification reaction time is in some cases greatly shortened as the amount of the addition products increases and as the amount of the epoxides in the addition product increases, the degree of condensation is increased, and the completeness of the reaction, as measured on the basis of lower carboxyl numbers, acid values and hydroxyl numbers, is increased. Of particular value is the reduction of the acid values in the finished polyester to very low levels.

In the polycondensation step, the addition products bring about a decided, and in some cases very appreciable, increase in the viscosity and hence in the molecular weight, while higher viscosities are achieved by increased amounts of the addition products, but especially by increasing the amounts of monoepoxide in the addition products. The addition products are therefore used preferentially in the esterification stage and afterwards in the polycondensation stage, and thus, they make it possible to use only one catalyst for the entire preparation of the polyester, including an initial transesterification stage, if any, in which the titanium compound is used alone.

The esterification that can be achieved in the esterification step is substantially more complete than has been achievable heretofore, as measured by the amount of water distilled off before the polycondensation is initiated by increasing the temperature and reducing the pressure.

The amount of the addition products can be 0.2 to 1.8 g of addition product per 0.001 g of titanium catalyst, preferably 0.3 to 1.5 g.

The addition products can be prepared in inert solvents, but preferably they are prepared without solvent, in which case the monoepoxide in question is heated under a nitrogen atmosphere in a round flask with superimposed column, at temperatures up to 200° C., preferably 70° to 100° C., with stirring. The addition of the phosphorous acid, preferably 99% phosphorous acid, is performed in portions or continuously, and cooling may be necessary on account of exothermic reactions. The reaction can be followed by a post-reaction period at temperatures of 60° to 90° C.

Addition products can be prepared and used, which have molar ratios of phosphorous acid to monoepoxide of 1:1, 1:2 or 1:3. The monoepoxides can be any known monoepoxides, especially the glycidyl esters of aliphatic or cycloaliphatic carboxylic acids, the glycidyl esters of monoalcohols and, in some cases, alkyl phenols as well as alkene oxides and, in some cases, cycloalkene oxides having preferably 5 to 10 carbon atoms.

Monoepoxides of relatively high boiling points are preferred.

Preferred epoxides are glycidyl esters of fatty acids of 6 to 15 carbon atoms. The addition product of phosphorous, acid with the glycidyl ester of branched-chain, saturated fatty acids made from a mixture having 8 to 10 carbon atoms is abbreviated "PC" in the examples, followed by the molar ratios ("Cardura E." Shell). Examples for monoepoxides from alkyl phenols are tolenyl, xylenyl and ethyl phenyl glycidyl ether, for alkylene oxides "butylene oxide, isobutylene oxide, pentene oxide, hexene oxide, heptene oxide, isoheptene oxide and styrene oxide, for cycloalkene oxides" cyclohexene oxide and alkyl substituted cyclohexene oxides. Also preferred are glycidyl ethers of saturated aliphatic alcohols of 4 to 6 carbon atoms, and olefinic oxides, i.e., epoxides of straight-chain aliphatic olefins with the double bond in any position, having 8 to 12 carbon atoms.

The components of the mixed polyesters prepared by the method of the invention can be any known aliphatic, cycloaliphatic or aromatic diols, in some cases triols and polyols, as well as aliphatic, cycloaliphatic or aromatic dicarboxylic acids, and, in some cases, tri- and polycarboxylic acids and their derivatives, especially their esters of alcohols of one to four carbon atoms and their anhydrides.

EXAMPLES

In the examples given below, the achieved degree of polycondensation is measured as the reduced viscosity, $\eta$red. $=\eta$rel.$-1$ at the concentration of 1 g of polymer in 100 ml of a solution of phenol and 2,2,4,4-tetrachloroethane in a ratio by weight of 3:2 at 25° C.

The determination of the melting point peak (Ts), of the recrystallization peak (Tr), and of the glass transition temperature (GT) was performed with a differential calorimeter, Mod. DSC-1, made by Perkin-Elmer.

The terminal group concentration is measured on the basis of the acid value (AV), hydroxyl number (OHN), both in mg of KOH per gram, and the carboxyl number (C) in mVal.COOH per kg of polymer, as described by H. Pohl, Analytic Chem. 26 (1954), 1614.

The Gardner color number (GCN) of the flowable or molten polyesters was determined in accordance with German industrial standard DIN 6961.

In the Examples 1 to 12, and in the example A given for purposes of comparison, the conditions of the actual polycondensation were equal, at 4 hours at 270° C. under a vacuum of 0.1 mbar, in order to show the effect of the addition products on degradation and discoloration on the basis of the color number at the same heat stress and at the comparatively high heat stress that often occurs in practice. Also for the sake of comparability, tetrabutyl titanate was used as the catalyst in most cases, although other soluble titanium catalysts can be used equally well, such as the soluble titanium chelates prepared from 1,3-diols, especially from 2,2,4-trimethyl-1,3-pentane dio, 2-methyl-2,4-pentanediol or 2-ethyl-1,3-hexanediol.

EXAMPLE 1

97 g of dimethyl terephthalate, 40.73 g of ethylene glycol, 60.63 g of neopentyl glycol and 0.0082 g of butyl titanate were transesterified under pure nitrogen, with stirring, for a period of 3 hours, at 160° to 190° C., 40 ml of methanol distilling out of the mixture. Then, 83 g of isophthalic acid and 0.485 g=0.0016 mol of adduct PC 1:1 was added. This reduced the temperature of the transesterification product to 160° C. The contents of the flask were then warmed over a period of 150 minutes to 180° C., while at the same time 18 ml of water distilled out. Then the temperature was raised over a period of 1.5 h to 270° C., and at the same time the pressure was reduced during this period to 0.1 mbar. After another 4 h under these conditions, the polycondensation was terminated by breaking the vacuum. The product thus obtained had the following characteristics:

| Viscosity | $\eta$red. | 0.616 |
|---|---|---|
| Glass transition point | GT | 56° C. |
| Carboxyl number | C | 28 mVal/kg |
| Gardner color number | GCN | 2 |

EXAMPLE A for comparison:

The procedure of Example 1 was performed in the presence of 0.0082 g of butyl titanate, but the addition product PC 1:1 was replaced by 0.0016 mol=0.496 g of triphenyl phosphite. The product thus obtained had the following characteristics:

| Esterification reaction time | 180 min. |
|---|---|
| $\eta$red. | 0.632 |
| GT | 56° C. |
| C | 35 mVal/kg |
| GCN | over 12 |

EXAMPLE 2

The procedure was the same as in Example 1, the PC 1:1=0.0016 mol being replaced by (a) 0.842 g PC 1:2=0.0016 mol, and (b) 1.225 g PC 1:3=0.0016 mol.

The products thus obtained had the following characteristics:

|  | (a) | (b) |
|---|---|---|
| Esterification reaction time | 110 min | 90 min |
| $\eta$red. | 0.820 | 0.835 |
| GT | 56° C. | 56° C. |
| C | 24 mVal/kg | 17 mVal/kg |
| GCN | 1-2 | 1 |

EXAMPLE 3

106.7 g of dimethyl terephthalate, 80.6 g of ethylene glycol and 0.0082 g of butyl titanate were transesterified as in Example 1, 44 ml of methanol being produced. Then 84.6 g of azelaic acid and 0.485 g=0.0016 mol of PC 1:1 was added and the esterification was performed as in Example 1, while 16.2 ml of water distilled out. Then the polycondensation was performed as in Example 1. The product had the following characteristics: ηred. 0.95, GT−5° C., C 19 and GCN 3.

EXAMPLE 4

The procedure of Example 3 was used, but the PC 1:1=0.0016 mol was replaced by the following adducts: (a) 0.842 g PC 1:2=0.0016 mol (b) 1.225 g PC 1:3=0.0016 mol.

The products thus obtained had the following characteristics:

|  | (a) | (b) |
| --- | --- | --- |
| Esterification reaction time | 90 min | 90 min |
| ηred. | 1.01 | 0.998 |
| GT | −5° C. | −5° C. |
| C | 17 mVal/kg | 19 mVal/kg |
| GCN | 2 | 2 |

EXAMPLE 5

116.4 g of dimethyl terephthalate, 45.88 g of ethylene glycol, 66.24 g of cyclohexane dimethanol and 0.0082 g of butyl titanate were transesterifed as in Example 1, while 48 ml of methanol distilled out. Then 66.4 g of terephthalic acid and 0.485 g=0.0016 mol PC 1:1 was added, and the esterification was performed as in Example 1, while 14 ml of water distilled out. Then the polycondensation was performed as in Example 1. The product had the following characteristics: ηred. 0.89, GT 84° C., C 31 and GCN 2.

EXAMPLE 6

The procedure was as in Example 5, but the PC 1:1=0.0016 mol was replaced by (a) 0.842 g PC 1:2=0.0016 mol, and (b) 1.225 g PC 1:3=0.0016 mol.

The products thus obtained had the following characteristics:

|  | (a) | (b) |
| --- | --- | --- |
| Esterification reaction time | 140 min | 90 min |
| ηred. | 0.932 | 0.948 |
| GT | 84 | 84 |
| C | 32 mVal/kg | 29 mVal/kg |
| GCN | 1-2 | 1-2 |

EXAMPLE 7

33.2 g of isophthalic acid, 116.8 g of adipic acid, 52.08 g of ethylene glycol, 38.94 g of 1,6-hexanediol, 0.0082 g of butyl titanate and 0.485 g=0.0016 mol PC 1:1 were esterified under pure nitrogen at 160°-180° C. for 190 minutes, with stirring, resulting in the distillation of 36 ml of water. Then the polycondensation was performed as in Example 1. The product thus obtained had the following characteristics: ηred. 0.663, GT−51° C., C 35 and GCN 4.

EXAMPLE 8

The procedure was the same as in Example 7, but the PC 1:1=0.0016 mol was replaced by (a) 0.842 g PC 1:2=0.0016 mol, and (b) 1.225 g PC 1:3=0.0016 mol.

The products thus obtained had the following characteristics:

|  | (a) | (b) |
| --- | --- | --- |
| Esterification reaction time | 160 min | 140 min |
| ηred. | 0.732 | 0.797 |
| GT | −51° C. | −51° C. |
| C | 34 mVal/kg | 28 mVal/kg |
| GCN | 2 | 1-2 |

EXAMPLE 9

135.8 g of dimethylterephthalate, 97.2 g of 1,4-butane-diol, 9.99 g of ethylene glycol, 16.77 g of neopentyl glycol and 0.0082 g of butyl titanate were transesterified as in Example 1, yielding 56 ml of methanol. Then 60.65 g of sebacic acid and 0.485 g=0.0016 mol PC 1:1 were added, and esterification was performed as in Example 1, 10.8 ml of water being distilled out. Then the polycondensation was performed as in Example 1. The product had the following characteristics: ηred. 1.67, Ts 153° C., Tr 80° C., C 14 and GCN 3-4.

EXAMPLE 10

The procedure of Example 9 was followed, but the PC 1:1=0.0016 mol was replaced by (a) 0.842 g PC 1:2=0.0016 mol and (b) 1,225 g PC 1:3=0.0016 mol.

The products thus obtained had the following characteristics:

|  | (a) | (b) |
| --- | --- | --- |
| Esterification reaction time | 130 min | 160 min |
| ηred. | 1.58 | 1.60 |
| Ts | 153° C. | 153° C. |
| Tr | 80° C. | 80° C. |
| C | 15 mVal/kg | 13 mVal/kg |
| GCN | 2 | 2 |

EXAMPLE 11

126.1 g of dimethylterephthalate, 99.0 g of 1,4-butanediol, 38.46 of tripropylene glycol, and 0.0082 g of butyl titanate were transesterified as in Example 1, yielding 52 ml of methanol. Then 51.1 g of adipic acid and 0.485 g=0.0016 mol PC 1:1 were added, and the esterification was performed as in Example 1, while 12.6 ml of water distilled out. Then the polycondensation was performed as in Example 1. The product had the following characteristics: ηred. 0.78, Ts 137° C., Tr 70° C., C 34 and GCN 4.

EXAMPLE 12

The procedure of Example 11 was followed, the PC 1:1=0.0016 mol being replaced by (a) 0.842 g PC 1:2=0.0016 mol, (b) 1.225 g PC 1:3=0.0016 mol.

The products thus obtained had the following characteristics:

|  | (a) | (b) |
| --- | --- | --- |
| Esterification reaction time | 130 min | 130 min |
| ηred. | 0.86 | 0.84 |

| | (a) | (b) |
|---|---|---|
| Ts | 137° C. | 137° C. |
| Tr | 70° C. | 70° C. |
| C | 29 mVal/kg | 31 mVal/kg |
| GCN | 2 | 2 |

EXAMPLE B for Comparison:

67.5 g of butanediol and 222 g of phthalic acid anhydride were maintained at 90°–100° C. for 50 minutes, with stirring, under pure nitrogen, while butylene diphthalate formed with an acid value of 295 mg KOH/g. Then, 0.195 g of butyl titanate, 31 g of ethylene glycol, 56.18 g of diethylene glycol, 185.12 g of neopentyl glycol, 43.8 g of adipic acid and 199.2 g of isophthalic acid were added. The flask contents were then heated over a period of 4 h to 220° C., while at the same time 78 ml of water distilled out. At 220° C., a vacuum of 300 mbar was applied after 30 minutes, and then it was reduced within 2 hours to 8 mbar. After one hour under these conditions, the condensation was terminated. The product had the following characteristics: ηred. 0.270, AV 16, OHN 32 and GCN 12–13.

EXAMPLE 13

The procedure was the same as in example B given for comparison, the following adducts being added in the esterification reaction: (a) PC 1:1=0.036 mol, (b) PC 1:2=0.036 mol, (c) PC 1:3=0.036 mol.

The products thus obtained had the following characteristics:

| | (a) | (b) | (c) |
|---|---|---|---|
| ηred. | 0.265 | 0.282 | 0.297 |
| AV | 8 mg KOH/g | <1 mg KOH/g | <1 mg KOH/g |
| OHN | 36 mg KOH/g | 33 mg KOH/g | 34 mg KOH/g |
| GCN | 3–4 | 1–2 | 1–2 |

Example C for comparison:

99.6 g of isophthalic acid, 355.2 g of phthalic acid anhydride, 108.0 g of 1,4-butanediol, 169.52 g of neopentyl glycol, 45.26 g of ethylene glycol and 0.195 g of butyl titanate were heated over a period of 5 hours under pure nitrogen to 220° C., with stirring, while 62 ml of water distilled off. Then a vacuum of 200 mbar was applied. After 2.5 h under these conditions the condensation was terminated.

The product obtained had the following characteristics: ηred. 0.225, AV 18, OHN 37 and GCN 9.

EXAMPLE 14

The procedure of Example for Comparison C was used, while in the esterification reaction the following were added: (a) PC 1:1=0.036 mol, (b) PC 1:2=0.036 mol, (c) PC 1:3=0.036 mol. The products thus obtained had the following characteristics:

| | (a) | (b) | (c) |
|---|---|---|---|
| ηred. | 0.232 | 0.240 | 0.244 |
| AV | 10 mg KOH/g | <1 mg KOH/g | <1 mg KOH/g |
| OHN | 35 mg KOH/g | 32 mg KOH/g | 35 mg KOH/g |
| GCN | 3 | 1–2 | 1–2 |

EXAMPLE 15

The procedure of Example for Comparison B was used, while the following adducts were added in the esterification step:

(a) Adduct from phosphorous acid and dodecene-1-oxide (hereinafter referred to as PD) in a molar ratio of 1:1=0.036 mol, (b) Same, in a molar ratio of 1:2=0.036 mol, and (c) Same, in a molar ratio of 1:3=0.036 mol.

The products thus obtained had the following characteristics:

| | (a) | (b) | (c) |
|---|---|---|---|
| ηred. | 0.272 | 0.266 | 0.281 |
| AV | 7 mg KOH/g | <1 mg KOH/g | <1 mg KOH/g |
| OHN | 37 mg KOH/g | 38 mg KOH/g | 33 mg KOH/g |
| GCN | 4 | 1–2 | 1–2 |

EXAMPLE 16

The procedure of Example for Comparison B was used, while in the esterification step, (a) the adduct was prepared from phosphorous acid and n-butylglycidyl ether (referred to hereinafter as PB) in a molar ratio of 1:1=0.036 mol, (b) PB in a molar ratio of 1:2=0.036 mol, and (c) PB in a molar ratio of 1:3=0.036 mol.

The products thus obtained had the following characteristics:

| | (a) | (b) | (c) |
|---|---|---|---|
| ηred. | 0.253 | 0.261 | 0.269 |
| AV | 9 mg KOH/g | <mg KOH/g | <1 mg KOH/g |
| OHN | 40 mg KOH/g | 32 mg KOH/g | 34 mg KOH/g |
| GCN | 4–5 | 1–2 | 1–2 |

It will be understood that the specification and examples are illustrative but not limitative of the present invention and that other embodiments within the spirit and scope of the invention will suggest themselves to those skilled in the art. Substitution of the glycidyl ester "Cardura E" in the addition product with phosphorous acid by ether, meta- or paretobuyl glycidyl ether, isooclene oxide, β-naphthyl glycidyl ether, cyclohexene oxide or amyl glycidyl ether gives results comparable to those achieved in examples 1 to 16.

We claim:

1. A method of preparing polyesters from polyfunctional alcohols and polybasic carboxylic acids and/or alkyl esters and/or anhydrides thereof, in the presence of catalytically active titanium compounds, comprising adding catalytic amounts of addition products prepared from phosphorous acid and monoepoxides as adjuvants in the preparation of the polyester.

2. The method of claim 1, further comprising the addition of other transesterification, esterification and polycondensation catalysts and further auxiliary substances in the preparation of the polyester.

3. The method of claim 1, wherein the catalytically active titanium compounds are titanium esters of aliphatic or cycloaliphatic alcohols having 3 to 12 carbon atoms.

4. The method of claim 3, wherein the aliphatic or cycloaliphatic alcohols have 4 to 10 carbon atoms.

5. The method of claim 4, wherein the titanium compounds are selected from the group consisting of butyl titanate or octyl titanate.

6. The method of claim 1, wherein the titanium compounds are soluble titanium chelates.

7. The method of claim 1, wherein the amount of addition products is 0.2 to 1.8 g per 0.001 g of catalytically active titanium compound.

8. The method of claim 1, wherein the molar ratio of phosphorous acid to monoepoxide is 1:1; 1:2; or 1:3.

9. The method of claim 1, wherein the monoepoxide is a glycidyl ester of aliphatic or cycloaliphatic carboxylic acids, monoalcohols, alkyl phenols, an alkene oxide or cycloalkene oxide.

10. The method of claim 1, wherein the monoepoxide is a glycidyl ether of a saturated aliphatic alcohol.

11. The method of claim 1, wherein the monoepoxide is an olefinic oxide.

* * * * *